United States Patent [19]

Shigihara

[11] Patent Number: 5,361,394
[45] Date of Patent: Nov. 1, 1994

[54] UPSTREAM SIGNAL CONTROL APPARATUS FOR CABLE TELEVISION SYSTEM

[75] Inventor: Hideo Shigihara, Fukaya, Japan

[73] Assignee: Kabushiki Kaisha Toshiba, Kawasaki, Japan

[21] Appl. No.: 869,113

[22] Filed: Apr. 15, 1992

Related U.S. Application Data

[63] Continuation of Ser. No. 630,059, Dec. 19, 1990, abandoned.

[30] Foreign Application Priority Data

Dec. 19, 1989 [JP] Japan ................................. 1-327236

[51] Int. Cl.⁵ .............................................. H04H 1/00
[52] U.S. Cl. ......................................... 455/5.1; 348/12
[58] Field of Search ..................... 455/3.1, 3.3, 5.1, 6.1, 455/10, 12.1, 127, 186.1, 234.1; 358/86

[56] References Cited

U.S. PATENT DOCUMENTS

| | | | |
|---|---|---|---|
| 4,520,508 | 5/1985 | Reichert et al. | 455/5 |
| 4,910,792 | 3/1990 | Takahata et al. | 455/12 |
| 4,982,440 | 1/1991 | Dufresne et al. | 455/5 |
| 5,091,919 | 2/1992 | Kuisma | 455/126 X |

FOREIGN PATENT DOCUMENTS 64-80188 3/1989 Japan.

Primary Examiner—Edward F. Urban
Attorney, Agent, or Firm—Cushman, Darby & Cushman

[57] ABSTRACT

In a cable television system having a two-way communication function in which downstream signals are transmitted from a broadcasting center to a plurality of terminals, upstream signals are transmitted from the plurality of terminals to the broadcasting center, and the broadcasting center and the plurality of terminals receive and demodulate the transmitted signals, a level detector of each terminal obtains a level detection signal by detecting the level of a downstream signal from the broadcasting center. A controller stores a level setting signal exhibiting a level change of negative linear characteristics with respect to the level of the downstream signal. The controller includes a level setting function for setting the transmission level of the upstream signal output from a communication signal modulator on the basis of the level setting signal.

3 Claims, 4 Drawing Sheets

UPSTREAM SIGNAL CONTROL APPARATUS FOR CABLE TELEVISION SYSTEM

This is a continuation of application Ser. No. 07/630,059, filed on Dec. 19, 1990, which was abandoned.

BACKGROUND OF THE INVENTION

1. Field of the Invention

The present invention relates to an upstream signal control apparatus for stabilizing an upstream signal transmitted from a terminal in a cable television system (to be referred to as a CATV system hereinafter) having a two-way communication function.

2. Description of the Related Art

In addition to a broadcasting function based on television signals, a CATV system has a two-way communication function which allows communication between a broadcasting center and terminals. A CATV system having a two-way communication function is called a two-way addressable CATV system. The two-way communication function enables communication of data between a broadcasting center and terminals. For example, data stored in a terminal can be erased, updated, or read by transmitting a downstream signal including command data from the broadcasting center. In addition, questionnaire data, public opinion survey data, or the like can be transmitted as an upstream signal from a terminal to the broadcasting center in response to a command therefrom. When an upstream signal is to be transmitted from a terminal to a broadcasting center by using such a two-way communication function, the upstream signal preferably has a sufficient level when it reaches the broadcasting center.

In a two-way addressable CATV system, therefore, when a new terminal is installed, the transmission level of an upstream signal to be transmitted from the terminal to the broadcasting center is adjusted. The transmission level of an upstream signal from a terminal is adjusted by the following two methods.

In the first method, when a terminal is installed, the degree of attenuation of the level of a downstream signal transmitted from the broadcasting center to the terminal is measured. The degree of attenuation of an upstream signal to be transmitted from the terminal to the broadcasting center is estimated from the degree of attenuation of the downstream signal. When the degree of attenuation of the upstream signal is estimated, the transmission level of the upstream signal is adjusted to fall within a predetermined range upon arrival of the upstream signal at the broadcasting center.

In the second method, an upstream signal detector is arranged in the broadcasting center. The upstream signal detector detects the level of an upstream signal from a terminal. When the level of the upstream signal is low, the broadcasting center transmits a transmission level control signal to the corresponding terminal so as to control its transmission level. With this operation, the transmission level of the upstream signal from the terminal is automatically controlled.

Both the methods, however, have the following drawbacks.

According to the first method, since the transmission level of a terminal is fixed once it is set, if, for example, there are drifts due to changes in temperature and fluctuations in signal level of trunk line systems due to changes in quality over time, variations in level of upstream signals from the respective terminals are increased at the broadcasting center. In addition, if the level of an upstream signal from a certain terminal falls outside an allowable range, an operator in the broadcasting center must go to a corresponding subscriber's house to adjust the transmission level again.

According to the second method, the transmission level of an upstream signal from each terminal is automatically controlled, and hence it is convenient. However, as the number of subscribers is increased, the communication time required to adjust the transmission levels of the terminals is prolonged. This means that a ratio of the communication time for adjustment to the total data communication time of the system is increased, and that the data communication speed is relatively decreased. If an adjustment frequency of the transmission levels of upstream signals is decreased in order to prevent such inconvenience, variations in transmission levels of terminals are increased.

SUMMARY OF THE INVENTION

It is, therefore, an object of the present invention to provide an upstream signal control apparatus for a cable television system in which the transmission level of an upstream signal is automatically managed by a terminal itself so as to be always kept stable.

It is another object of the present invention to provide an apparatus which can decrease the number of times that a broadcasting center controls a terminal when the transmission level of an upstream signal from the terminal is to be set.

In order to achieve the above object, according to the present invention, there is provided an upstream signal control apparatus for a cable television system having a two-way communication function in which downstream signals are transmitted from a broadcasting center to a plurality of terminals, upstream signals are transmitted from the plurality of terminals to the broadcasting center, and the broadcasting center and the plurality of terminals receive and demodulate the transmitted signals, comprising:

- level detecting means, arranged in each of the terminals, for obtaining a level detection signal by detecting a level of a downstream signal from the broadcasting center;
- storage means for storing a level setting signal exhibiting a level change of negative linear characteristics with respect to the level of the downstream signal; and
- level setting means for setting a transmission level of the upstream signal on the basis of the level setting signal.

DETAILED DESCRIPTION OF THE PREFERRED EMBODIMENTS

An embodiment of the present invention will be described below with reference to the accompanying drawings.

Figure 1:
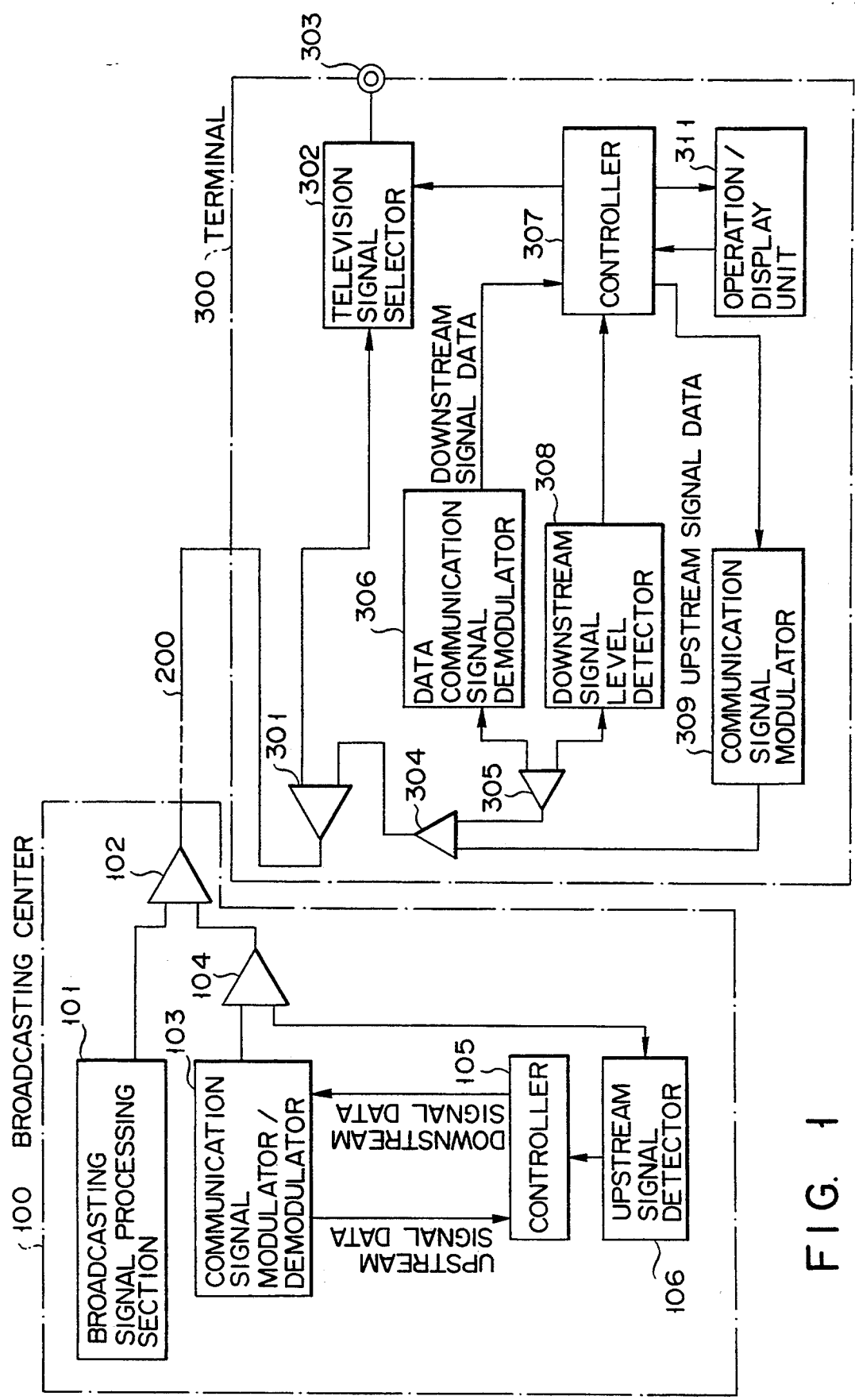
FIG. 1 is a block diagram showing an embodiment of the present invention.

FIG. 1 shows an embodiment of the present invention. Reference numeral 100 denotes a broadcasting center connected to a terminal 300 through a cable transmission line 200. Although FIG. 1 shows only one terminal, a large number of terminals are arranged in practice.

A broadcasting signal processing section 101 is arranged in the broadcasting center 100. A broadcasting signal (television signal) from the broadcasting signal processing section 101 is output to the cable transmission line 200 through a two-way distributor 102. The signal transmitted from the terminal 300 through the cable transmission line 200 is supplied to a communication signal modulator/demodulator 103 through the two-way distributor 102 and a two-way distributor 104. Upstream signal data obtained by modulation in the communication signal modulator/demodulator 103 is supplied to and decoded by a controller 105. The upstream signal supplied through the two-way distributors 102 and 104 is supplied to an upstream signal detector 106. The upstream signal detector 106 detects the level of an upstream signal and supplies the level detection signal to the controller 105. In addition, a downstream signal can be transmitted from the broadcasting center 100 to the terminal 300. Downstream data is output from the controller 105 and is supplied to the communication signal modulator/demodulator 103. The communication signal modulator/demodulator 103 modulates the downstream data and outputs it, as a downstream signal, to the two-way distributors 104 and 102 through the cable transmission line 200.

The terminal 300 will be described below.

The broadcasting signal and the downstream signal from the cable transmission line 200 are supplied to a two-way distributor 301. One terminal of the two-way distributor 301 is connected to a television signal selector 302. The television signal selector 302 selects a CATV channel in accordance with channel selection data from a controller 307 and frequency-converts a television signal of the selected CATV channel. The frequency-converted television signal is output to an output terminal 303 and is supplied to a television receiver.

The other terminal of the two-way distributor 301 is connected to a two-way distributor 304. One terminal of the two-way distributor 304 is connected to a two-way distributor 305. The other terminal of the two-way distributor 304 is connected to a communication signal modulator 309. One terminal of the two-way distributor 305 is connected to a communication signal demodulator 306. The other terminal of the two-way distributor 305 is connected to a downstream signal detector 308. The communication signal demodulator 306 obtains downstream data by demodulating the downstream signal transmitted from the broadcasting center 100 and supplies it to the controller 307. The downstream signal detector 308 detects the level of the downstream signal transmitted from the broadcasting center 100, and inputs the level detection signal to the controller 307. The terminal 300 can also transmit an upstream signal to the broadcasting center 100. The upstream signal data is output from the controller 307 and is supplied to the communication signal modulator 309. The communication signal modulator 309 outputs the upstream signal data, as an upstream signal, to the cable transmission line 200 through the two-way distributors 304 and 301.

Reference numeral 311 denotes an operation/display unit connected to the controller 307. For example, the unit 311 is used to select a reception channel and to display a currently selected channel number.

This embodiment has the above-described arrangement. A concept of this system will be described below.

Figure 2:
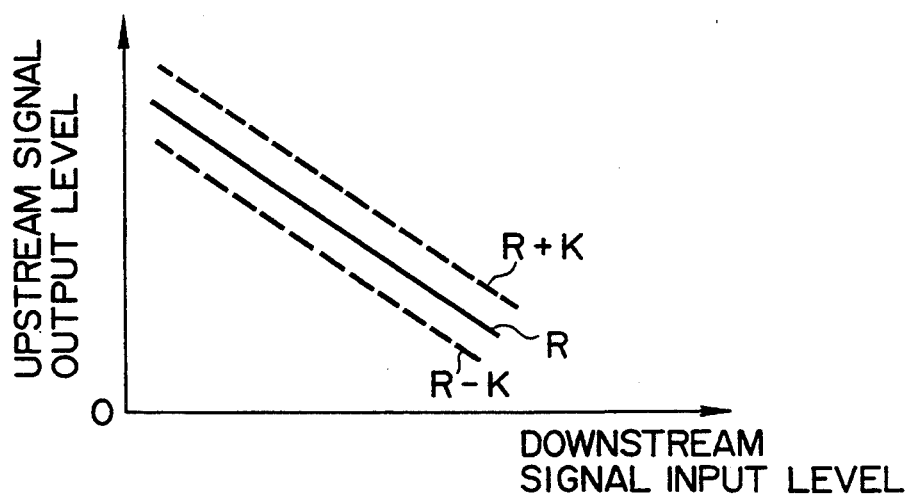
FIG. 2 is a graph showing characteristics of a level setting section for an upstream signal from a terminal according to the present invention.

If the loss of an upstream signal transmitted from the terminal 300 on the transmission line is increased, the signal level is decreased when it is input to the broadcasting center. This equally applies to a downstream signal. Therefore, in order to ensure a stable level of an upstream signal at the input portion of the broadcasting center 100, the level of the upstream signal may be set with respect to the input level of the downstream signal at the terminal 300 in accordance with characteristics shown in FIG. 2. Referring to FIG. 2, reference symbol R denotes a characteristic curve of a reference signal (level setting signal) for controlling the level of an upstream signal. A level change of this reference signal with respect to the level of a downstream signal exhibits negative linear characteristics. The level of an upstream signal is changed in accordance with the reference signal R. This reference signal R is stored in an internal memory of the controller 307. The reference signal R is referred to by a level detection signal obtained by the downstream signal detector 308 and is used as a gain control signal for an output amplifier of the communication signal modulator 309.

In the CATV system, it is expected that the physical distance between the broadcasting center 100 and each terminal is increased. It is also expected that variations in transmission characteristics are increased. For this reason, in this system, a correction signal K may be added to or subtracted from the reference signal R to form a signal (R+K) or (R−K) for setting a level for new characteristics. When the level setting signal (R+K) or (R−K) is formed, this new level setting signal is stored in the memory of the controller 307 in place of the reference signal R.

Figure 3:
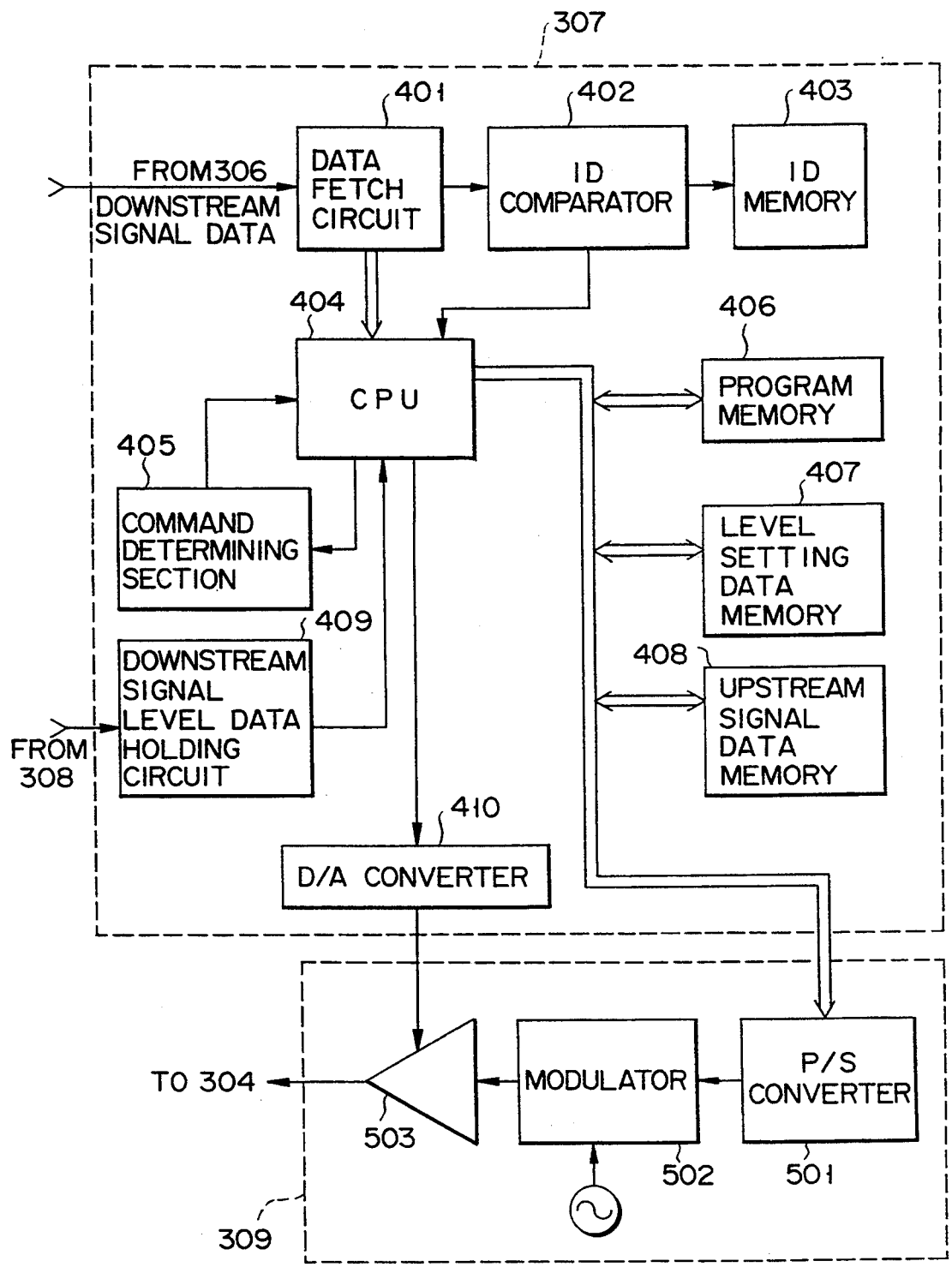
FIG. 3 is a block diagram showing an arrangement of a controller and of a communication signal modulator in FIG. 1.

FIG. 3 shows a more detailed arrangement of a portion, of the internal arrangement of the controller 307, which is associated with the present invention.

The downstream data demodulated by the communication signal demodulator 306 is input to a data fetch circuit 401. The address (ID code) in the data fetched in to the data fetch circuit 401, assigned to the terminal is detected by an ID comparator 402. This detection is performed by comparing an assigned ID code in an ID memory 403 with a transmitted reception ID code. When the ID codes coincide with each other, the downstream data in the data fetch circuit 401 is fetched into a CPU 404. The CPU 404 outputs a command included in the downstream signal data to a command determining section 405 so as to determine the content of the command.

If the content of the command is an instruction to transmit the data stored in the terminal to the broadcasting center, the CPU 404 is operated in accordance with a data transmission program stored in a program memory 406. The CPU 404 reads a level detection signal indicating the level of a downstream signal from a detection signal latch circuit 409. CPU 404 then designates an address, of a level setting data memory 407, corresponding to the level detection signal to read out a level setting signal, and supplies it to a D/A converter 410. As a result, the D/A converter 410 outputs a control signal to be supplied to a gain control terminal of an output amplifier 503 of the communication signal modulator 309. Subsequently, the CPU 404 reads out upstream signal data from a data memory 408 and outputs it to a parallel/serial converter 501 of the communication signal modulator 309. The parallel/serial converter 501 supplies serial digital data to a modulator 502. The modulator 502 is constituted by, e.g., a modulator of an FSK modulation scheme and is designed to supply a modulation output to the output amplifier 503. With this operation, an upstream signal is transmitted.

If the content of the next command is an instruction to add the correction signal K to the reference signal R stored in the level setting data memory 407, the CPU 404 is operated in accordance with a data update program stored in the program memory 406. In this case, the reference signal R is read out from the level setting data memory 407 by the CPU 404, and the correction signal K is added to the reference signal R to form a new level setting signal (R+K). The signal (R+K) is then stored in the data memory 407. Subsequently, the gain of the output amplifier 503 is set in accordance with the new level setting signal.

The reference signal R need not be corrected in a normal operation period. For example, such correction may be performed when terminals are greatly increased or decreased in number, or during a special service period. Therefore, this correction does not influence the normal data communication speed.

Figure 4:
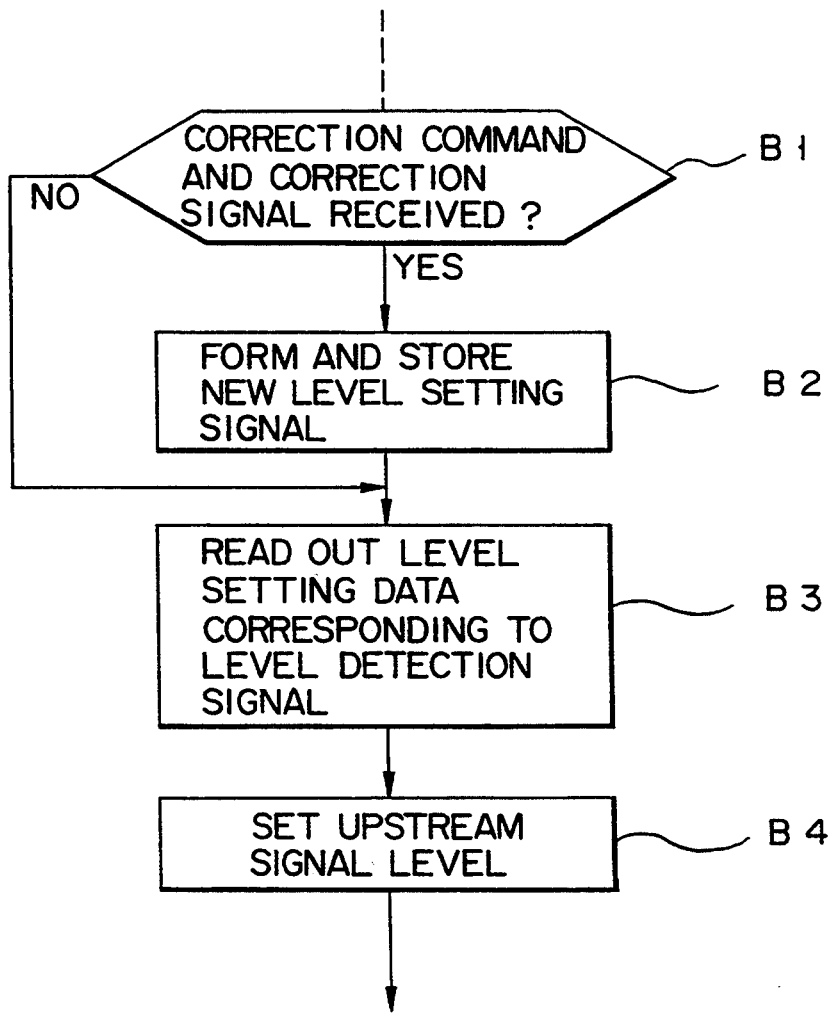
FIG. 4 is a flow chart showing part of a signal processing routine of a broadcasting center.

FIG. 4 is a flow chart for forming a new level setting signal by adding/subtracting the correction signal K to/from the reference signal R. In step B1, a command for correcting a level setting signal and the correction signal K are received. In step B2, data (e.g., the reference signal R) which has been stored in the level setting data memory 407 is corrected in accordance with the correction signal K and a new level setting signal is formed. The new level setting signal is then stored in the level setting data memory 407. In steps B3 and B4, a transmission level based on the new level setting signal is set.

Figure 5:
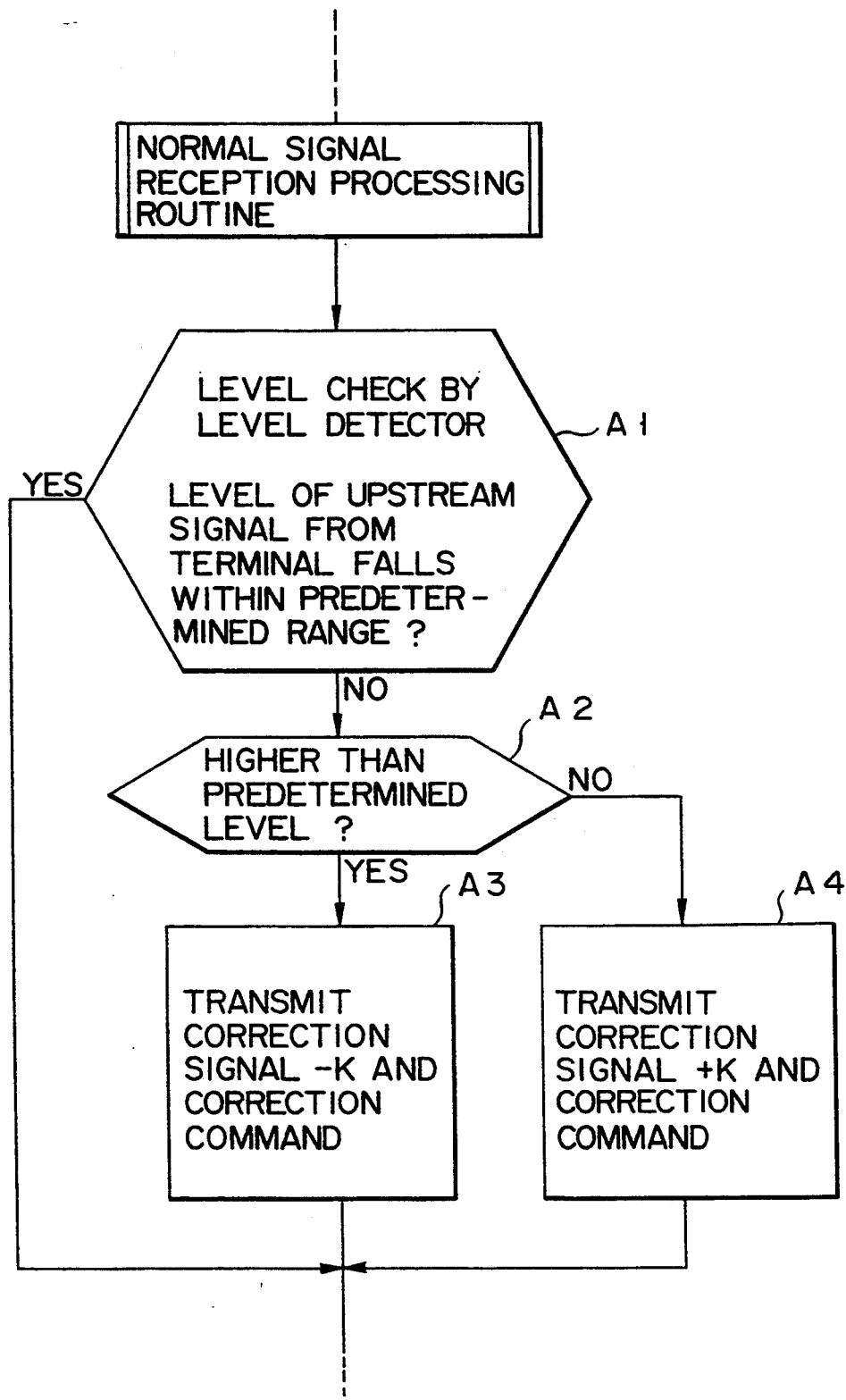
FIG. 5 is a flow chart showing part of a signal processing routine of a terminal.

FIG. 5 shows a signal processing routine to be employed when the reference signal R is corrected in the broadcasting center 100.

The level of a terminal is detected by the upstream signal detector 106 and is input to the controller 105. The controller 105 checks whether the level of the upstream signal from the terminal whose address is designated falls within a predetermined range (step A1). If the level falls outside the predetermined range, the controller 105 checks whether the level is higher or lower than the predetermined level (step A2). If it is higher than the predetermined level, the controller 105 transmits a characteristic correction command (for decreasing the upstream signal level) and a correction signal −K indicating a correction amount, as a downstream signal, to the corresponding terminal (step A3). In contrast to this, if the level is lower than the predetermined level, the controller 105 outputs a characteristic correction command (for increasing the upstream signal level) and a signal +K indicating a correction amount, as a downstream signal, to the corresponding terminal (step A4). The signals ±K need not always be constant and may be increased in value when the difference between the a predetermined level and an upstream signal is large. With this operation, the characteristics of a level setting signal at the terminal can be changed.

As described above, according to the present invention, at a terminal, the output level of an upstream signal is automatically adjusted in accordance with the characteristics of a level setting signal read out on the basis of a downstream signal level detection result. As a result, at the broadcasting center 100, the load of management of an upstream signal level is greatly reduced.

In addition, since the time required to set the level of an upstream signal is shortened, a decrease in data communication speed can be prevented. Furthermore, since output level control of an upstream signal is adaptively and automatically performed, the levels of upstream signals at the broadcasting center are free from variations due to temperature fluctuations or fluctuations in load of a circuit. In the above-described embodiment, the reference signal R is stored in the memory in advance. However, similar to a correction signal, the reference signal R may be transmitted from the broadcasting center to a terminal. In addition, a correction signal may serve as a signal for changing the gradient of a reference signal.

As has been described above, according to the present invention, the number of times that the broadcasting center directly controls terminals so as to control the levels of upstream signals can be decreased. In addition, the level of an upstream signal is automatically managed by a terminal itself, and the broadcasting center can always receive an upstream signal of a stable level.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An upstream signal control apparatus for a cable television system having a two-way communication function wherein a downstream signal is transmitted from a broadcasting center to at least one terminal, an upstream signal is transmitted from the at least one terminal to the broadcasting center, and the broadcasting center and the at least one terminal receive and demodulate the upstream signal and the downstream signal, respectively, comprising:

level detecting means, in each of the at least one terminal, for generating a level detection signal in accordance with a level of the downstream signal transmitted from the broadcasting center;

level setting signal storing means, in each of the at least one terminal, for storing a level setting signal to be read from the level setting signal storing means in accordance with the level detection signal, the level setting signal indicating that a transmission level of the upstream signal is to be at a first level when the level of the downstream signal is at a second level, and indicating that the transmission level of the upstream signal is to be at a third level when the level of the downstream signal is at a fourth level, wherein said first level is higher than said second level and said third level is lower than said fourth level;

level setting means, in each of the at least one terminal, for setting the transmission level of the upstream signal in accordance with the level setting signal;

obtaining means for obtaining a correction signal for correcting the level setting signal, wherein the correction signal is obtained from the downstream signal transmitted from the broadcasting center; and means for correcting the level setting signal in accordance with the correction signal obtained by the obtaining means to form a new level setting signal, and replacing the level setting signal stored in the level setting signal storing means with the new level setting signal.

2. A level setting signal correction apparatus for a cable television system having a two-way communication function wherein a downstream signal is transmitted from a broadcasting center to at least one terminal, an upstream signal is transmitted from the at least one terminal to the broadcasting center, and the broadcasting center and the at least one terminal receive and demodulate the upstream signal and the downstream signal, respectively, comprising:

upstream signal detecting means, in the broadcasting center, for detecting a level of the upstream signal from the at least one terminal;

means, in the broadcasting center, for determining whether the level detected by the upstream signal detecting means is within a predetermined range;

level setting signal storing means, in each of the at least one terminal, for storing a level setting signal, the level setting signal indicating that a transmission level of the upstream signal is to be at a first level when the level of the downstream signal is at a second level, and indicating that the transmission level of the upstream signal is to be at a third level when the level of the downstream signal is at a fourth level, wherein said first level is higher than said second level and said third level is lower than said fourth level;

means, in the broadcasting center, for transmitting a correction signal to vary the level setting signal of the at least one terminal when the determining means determines that the level of the upstream signal is not within the predetermined range;

obtaining means for receiving the correction signal transmitted from the broadcasting center; and means for correcting the level setting signal in accordance with the correction signal received by the obtaining means to form a new level setting signal, and replacing the level setting signal stored in the level setting signal storing means with the new level setting signal.

3. A cable television system having a two-way communication function wherein a downstream signal is transmitted from a broadcasting center to at least one terminal, an upstream signal is transmitted from the at least one terminal to the broadcasting center, and the broadcasting center and the at least one terminal receive and demodulate the upstream signal and the downstream signal, respectively, comprising:

level detecting means, in each of the at least one terminal, for generating a level detection signal in accordance with a level of the downstream signal transmitted from the broadcasting center;

level setting signal storing means, in each of the at least one terminal, for storing a level setting signal to be read out from the level setting signal storing means in accordance with the level detection signal, the level setting signal indicating that a transmission level of the upstream signal is to be a first level when the level of the downstream signal is at a second level, and indicating that the transmission level of the upstream signal is to be at a third level when the level of the downstream signal is at a fourth level, wherein said first level is higher than said second level and said third level is lower than said fourth level;

level setting means, in each of the at least one terminal, for setting the transmission level of the upstream signal in accordance with the level setting signal;

upstream signal detecting means, in the broadcasting center, for detecting the transmission level of the upstream signal from the at least one terminal;

means, in the broadcasting center, for determining whether the transmission level of the upstream signal detected by the upstream signal detecting means is within a predetermined range;

means, in the broadcasting center, for transmitting a correction signal to vary the level setting signal of the at least one terminal when the determining means determines that the transmission level of the upstream signal is not within the predetermined range;

obtaining means for receiving the correction signal transmitted from the broadcasting center; and means for correcting the level setting signal in accordance with the correction signal received by the obtaining means to form a new level setting signal, and replacing the level setting signal stored in the level setting signal storing means with the new level setting signal.

* * * * *